(12) United States Patent
Lippincott et al.

(10) Patent No.: US 8,966,110 B2
(45) Date of Patent: Feb. 24, 2015

(54) DYNAMIC BANDWIDTH THROTTLING

(75) Inventors: Lisa Ellen Lippincott, Berkeley, CA (US); Peter James Lincroft, Albany, CA (US); Dennis Sidney Goodrow, Santa Rosa, CA (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 12/878,881

(22) Filed: Sep. 9, 2010

(65) Prior Publication Data

US 2011/0066752 A1    Mar. 17, 2011

Related U.S. Application Data

(60) Provisional application No. 61/242,278, filed on Sep. 14, 2009.

(51) Int. Cl.
*G06F 15/16* (2006.01)
*H04L 12/26* (2006.01)
*H04L 12/825* (2013.01)

(52) U.S. Cl.
CPC .......... *H04L 43/0894* (2013.01); *H04L 43/106* (2013.01); *H04L 47/25* (2013.01)
USPC .......................... 709/233; 709/223; 709/224

(58) Field of Classification Search
USPC ........................................ 709/223, 224, 233
See application file for complete search history.

(56) References Cited

U.S. PATENT DOCUMENTS

| | | | |
|---|---|---|---|
| 5,010,571 A | 4/1991 | Katznelson | |
| 5,586,304 A | 12/1996 | Stupek, Jr. et al. | |
| 5,649,099 A | 7/1997 | Theimer et al. | |
| 5,732,137 A | 3/1998 | Aziz | |
| 5,751,967 A | 5/1998 | Raab et al. | |
| 5,958,050 A | 9/1999 | Griffin et al. | |
| 6,123,737 A | 9/2000 | Sadowsky | |
| 6,128,738 A | 10/2000 | Doyle et al. | |
| 6,151,643 A | 11/2000 | Cheng et al. | |
| 6,161,218 A | 12/2000 | Taylor | |
| 6,192,404 B1 | 2/2001 | Hurst et al. | |
| 6,233,449 B1 | 5/2001 | Glitho et al. | |

(Continued)

FOREIGN PATENT DOCUMENTS

| | | |
|---|---|---|
| JP | 2001318814 A | 11/2001 |
| JP | 2002523841 T | 7/2002 |

(Continued)

OTHER PUBLICATIONS

Final Office Action mailed Dec. 4, 2013, U.S. Appl. No. 12/882,023, 15 pages.
Response to Final Office Action filed with the USPTO on Sep. 17, 2013 for U.S. Appl. No. 12/882,023; 13 pages.
Advisory Action mailed Feb. 26, 2014 for U.S. Appl. No. 12/882,023; 3 pages.
Response to Final Office Action filed Jan. 10, 2014, U.S. Appl. No. 12/882,023, 14 pages.
Response to Final Office Action filed Apr. 3, 2014, U.S. Appl. No. 12/882,023, 14 pages.

(Continued)

*Primary Examiner* — Anthony Mejia
(74) *Attorney, Agent, or Firm* — Stephen R. Tkacs; Stephen J. Walder, Jr.; Jeffrey S. LaBaw

(57) ABSTRACT

An approximation of the bandwidth of the narrowest link in a network is determined by watching how fast data gets to the other end and then back again. The rate of data transmission is limited according to this approximation. Dynamic capacity of the link, i.e. the amount of data that can be in-flight at the same time, neglecting any buffers, is also tracked. The technique looks at how much data is in-flight and, if there is more data in flight than the dynamic capacity of the network, the data transmission rate is slowed down.

20 Claims, 3 Drawing Sheets

(56) References Cited

U.S. PATENT DOCUMENTS

| | | |
|---|---|---|
| 6,233,612 B1 | 5/2001 | Fruchtman et al. |
| 6,237,144 B1 | 5/2001 | Delo |
| 6,240,390 B1 | 5/2001 | Jih |
| 6,240,394 B1 | 5/2001 | Uecker et al. |
| 6,240,451 B1 | 5/2001 | Campbell et al. |
| 6,256,664 B1 | 7/2001 | Donoho et al. |
| 6,256,668 B1 | 7/2001 | Slivka et al. |
| 6,263,362 B1 | 7/2001 | Donoho et al. |
| 6,289,394 B1 | 9/2001 | Kozuka |
| 6,289,510 B1 | 9/2001 | Nakajima |
| 6,321,258 B1 | 11/2001 | Stollfus et al. |
| 6,324,691 B1 | 11/2001 | Gazdik |
| 6,324,693 B1 | 11/2001 | Brodersen et al. |
| 6,327,617 B1 | 12/2001 | Fawcett |
| 6,330,715 B1 | 12/2001 | Razzaghe-Ashrafi |
| 6,345,386 B1 | 2/2002 | Delo et al. |
| 6,347,396 B1 | 2/2002 | Gard et al. |
| 6,347,398 B1 | 2/2002 | Parthasarathy et al. |
| 6,351,536 B1 | 2/2002 | Sasaki |
| 6,353,902 B1 | 3/2002 | Kulatunge et al. |
| 6,353,926 B1 | 3/2002 | Parthesarathy et al. |
| 6,353,928 B1 | 3/2002 | Altberg et al. |
| 6,356,936 B1 | 3/2002 | Donoho et al. |
| 6,360,366 B1 | 3/2002 | Heath et al. |
| 6,363,524 B1 | 3/2002 | Loy |
| 6,378,128 B1 | 4/2002 | Edelstein et al. |
| 6,381,742 B2 | 4/2002 | Forbes et al. |
| 6,389,464 B1 | 5/2002 | Krishnamurthy et al. |
| 6,389,589 B1 | 5/2002 | Mishra et al. |
| 6,398,464 B1 | 6/2002 | Yagai et al. |
| 6,405,250 B1 | 6/2002 | Lin et al. |
| 6,407,988 B1 | 6/2002 | Agraharam et al. |
| 6,418,478 B1 | 7/2002 | Ignatius et al. |
| 6,418,554 B1 | 7/2002 | Delo et al. |
| 6,434,606 B1 * | 8/2002 | Borella et al. ............... 709/214 |
| 6,449,642 B2 | 9/2002 | Bourke-Dunphy et al. |
| 6,460,175 B1 | 10/2002 | Ferri et al. |
| 6,477,703 B1 | 11/2002 | Smith et al. |
| 6,487,603 B1 * | 11/2002 | Schuster et al. ............... 709/231 |
| 6,493,594 B1 | 12/2002 | Kraml |
| 6,496,977 B1 | 12/2002 | Hamilton, II et al. |
| 6,516,316 B1 | 2/2003 | Ramasubramani et al. |
| 6,523,166 B1 | 2/2003 | Mishra et al. |
| 6,526,507 B1 | 2/2003 | Cromer et al. |
| 6,532,491 B1 | 3/2003 | Lakis et al. |
| 6,535,977 B1 | 3/2003 | Holle et al. |
| 6,557,054 B2 | 4/2003 | Reisman |
| 6,571,186 B1 | 5/2003 | Ward |
| 6,574,537 B2 | 6/2003 | Kipersztok et al. |
| 6,594,369 B1 | 7/2003 | Une |
| 6,594,692 B1 | 7/2003 | Reisman |
| 6,594,759 B1 | 7/2003 | Wang |
| 6,604,130 B2 | 8/2003 | Donoho et al. |
| 6,611,862 B2 | 8/2003 | Reisman |
| 6,622,146 B1 | 9/2003 | Sato et al. |
| 6,654,714 B1 | 11/2003 | Gentile et al. |
| 6,658,464 B2 | 12/2003 | Reisman |
| 6,658,489 B1 | 12/2003 | Asselin |
| 6,681,243 B1 | 1/2004 | Putzolu et al. |
| 6,725,242 B2 | 4/2004 | Gardner |
| 6,725,452 B1 | 4/2004 | Te'eni et al. |
| 6,735,766 B1 | 5/2004 | Chamberlain et al. |
| 6,745,224 B1 | 6/2004 | D'Souza et al. |
| 6,745,766 B2 | 6/2004 | Fini |
| 6,751,661 B1 | 6/2004 | Geddes |
| 6,763,517 B2 | 7/2004 | Hines |
| 6,769,009 B1 | 7/2004 | Reisman |
| 6,789,255 B1 | 9/2004 | Pedrizetti et al. |
| 6,802,061 B1 | 10/2004 | Parthasarathy et al. |
| 6,804,663 B1 | 10/2004 | Delo |
| 6,836,794 B1 | 12/2004 | Lucovsky et al. |
| 6,851,115 B1 | 2/2005 | Cheyer et al. |
| 6,871,281 B2 | 3/2005 | Schwab et al. |
| 6,904,457 B2 | 6/2005 | Goodman |
| 6,920,631 B2 | 7/2005 | Delo |
| 6,922,831 B1 | 7/2005 | Kroening et al. |
| 6,931,434 B1 | 8/2005 | Donoho et al. |
| 6,941,453 B2 | 9/2005 | Rao |
| 6,954,790 B2 | 10/2005 | Forslow |
| 6,971,094 B1 | 11/2005 | Ly |
| 6,996,815 B2 | 2/2006 | Bourke-Dunphy et al. |
| 6,996,819 B1 | 2/2006 | Alanis |
| 6,998,819 B2 | 2/2006 | Jin |
| 7,134,019 B2 | 11/2006 | Shelest et al. |
| 7,137,040 B2 | 11/2006 | Bae et al. |
| 7,171,479 B2 * | 1/2007 | Buchanan et al. ............ 709/228 |
| 7,185,229 B2 | 2/2007 | Cromer et al. |
| 7,275,048 B2 | 9/2007 | Bigus et al. |
| 7,277,919 B1 | 10/2007 | Donoho et al. |
| 7,333,517 B2 * | 2/2008 | Madhavapeddi et al. ...... 370/509 |
| 7,398,272 B2 | 7/2008 | Hindawi et al. |
| 7,509,377 B2 * | 3/2009 | Harvey et al. ................. 709/206 |
| 7,523,190 B1 | 4/2009 | Bickerstaff et al. |
| 7,558,953 B2 | 7/2009 | Osthoff et al. |
| 7,577,097 B2 * | 8/2009 | Tan et al. ....................... 370/237 |
| 7,586,848 B1 * | 9/2009 | Gunduzhan ..................... 370/235 |
| 7,620,816 B1 | 11/2009 | Vigue et al. |
| 7,630,401 B2 * | 12/2009 | Iwamura ........................ 370/468 |
| 7,668,938 B1 | 2/2010 | Phillips et al. |
| 7,787,379 B2 * | 8/2010 | Mekkattuparamban et al. ............................... 370/235 |
| 7,830,816 B1 * | 11/2010 | Gonzalez et al. ............. 370/252 |
| 7,953,113 B2 * | 5/2011 | Elliot et al. ................... 370/468 |
| 7,962,632 B2 | 6/2011 | Lipsanen |
| 7,969,900 B2 * | 6/2011 | Abdo et al. ................... 370/252 |
| 8,055,617 B2 | 11/2011 | Hindawi et al. |
| 8,161,149 B2 | 4/2012 | Lippincott et al. |
| 8,165,088 B2 * | 4/2012 | Oba ............................... 370/331 |
| 8,171,364 B2 | 5/2012 | Veillette |
| 8,315,262 B2 * | 11/2012 | Toscano ..................... 370/395.62 |
| 8,495,157 B2 | 7/2013 | Goodrow et al. |
| 8,543,682 B2 * | 9/2013 | Menon .......................... 709/224 |
| 8,660,006 B2 * | 2/2014 | Torres et al. .................. 370/235 |
| 2001/0032091 A1 | 10/2001 | Schultz et al. |
| 2001/0042104 A1 | 11/2001 | Donoho et al. |
| 2002/0112200 A1 | 8/2002 | Hines |
| 2002/0147764 A1 | 10/2002 | Krupczak |
| 2002/0152384 A1 | 10/2002 | Shelest et al. |
| 2002/0188691 A1 | 12/2002 | Ignatius et al. |
| 2003/0033394 A1 | 2/2003 | Stine |
| 2003/0033396 A1 | 2/2003 | McCall |
| 2003/0033400 A1 | 2/2003 | Pawar et al. |
| 2003/0041167 A1 | 2/2003 | French et al. |
| 2003/0074321 A1 | 4/2003 | Peled |
| 2003/0074358 A1 | 4/2003 | Sarbaz et al. |
| 2003/0088542 A1 | 5/2003 | McGee et al. |
| 2003/0097454 A1 | 5/2003 | Yamakawa et al. |
| 2003/0126256 A1 | 7/2003 | Cruickshank, III et al. |
| 2003/0177179 A1 * | 9/2003 | Jones et al. ................... 709/203 |
| 2003/0187868 A1 | 10/2003 | Igarashi |
| 2003/0202480 A1 * | 10/2003 | Swami .......................... 370/252 |
| 2003/0233645 A1 | 12/2003 | Cohen et al. |
| 2003/0233646 A1 | 12/2003 | Cohen et al. |
| 2004/0039816 A1 | 2/2004 | Bae et al. |
| 2004/0117275 A1 | 6/2004 | Billera |
| 2004/0174904 A1 | 9/2004 | Kim et al. |
| 2004/0187105 A1 | 9/2004 | Inada |
| 2004/0213211 A1 | 10/2004 | Green |
| 2004/0215781 A1 | 10/2004 | Pulsipher et al. |
| 2004/0223505 A1 * | 11/2004 | Kim et al. ..................... 370/412 |
| 2004/0230644 A1 | 11/2004 | Aratake |
| 2004/0230854 A1 * | 11/2004 | Elko et al. ..................... 713/400 |
| 2004/0246975 A1 | 12/2004 | Joshi |
| 2004/0255048 A1 | 12/2004 | Lev Ran et al. |
| 2004/0260949 A1 | 12/2004 | Aoki et al. |
| 2005/0002408 A1 | 1/2005 | Lee |
| 2005/0005026 A1 | 1/2005 | Brown et al. |
| 2005/0047343 A1 * | 3/2005 | Sharony et al. ............... 370/235 |
| 2005/0054327 A1 | 3/2005 | Johnston |
| 2005/0081156 A1 | 4/2005 | Clark et al. |
| 2005/0086477 A1 | 4/2005 | Lin et al. |
| 2005/0086534 A1 | 4/2005 | Hindawi et al. |
| 2005/0091501 A1 | 4/2005 | Osthoff et al. |
| 2005/0120160 A1 | 6/2005 | Plouffe et al. |

(56) References Cited

U.S. PATENT DOCUMENTS

| | | | |
|---|---|---|---|
| 2005/0180326 A1 | 8/2005 | Goldflam et al. | |
| 2006/0095388 A1 | 5/2006 | Brown et al. | |
| 2006/0104370 A1* | 5/2006 | Yamanaka et al. | 375/242 |
| 2006/0168291 A1* | 7/2006 | van Zoest et al. | 709/231 |
| 2006/0253446 A1 | 11/2006 | Leong et al. | |
| 2006/0268713 A1* | 11/2006 | Lundstrom | 370/235 |
| 2007/0019552 A1* | 1/2007 | Senarath et al. | 370/235 |
| 2007/0050645 A1 | 3/2007 | Siegmund | |
| 2007/0070890 A1* | 3/2007 | Rojahn | 370/229 |
| 2007/0091921 A1* | 4/2007 | Elliot et al. | 370/468 |
| 2007/0115814 A1* | 5/2007 | Gerla et al. | 370/230 |
| 2007/0121511 A1* | 5/2007 | Morandin | 370/235 |
| 2007/0124412 A1* | 5/2007 | Narayanaswami et al. | 709/217 |
| 2007/0147435 A1* | 6/2007 | Hamilton et al. | 370/503 |
| 2007/0180119 A1* | 8/2007 | Khivesara et al. | 709/226 |
| 2007/0204078 A1 | 8/2007 | Boccon-Gibod et al. | |
| 2007/0280253 A1 | 12/2007 | Rooholamini et al. | |
| 2007/0288914 A1 | 12/2007 | Brannock et al. | |
| 2008/0016335 A1 | 1/2008 | Takahashi et al. | |
| 2008/0052054 A1 | 2/2008 | Beverina et al. | |
| 2008/0144493 A1* | 6/2008 | Yeh | 370/230 |
| 2008/0192695 A1 | 8/2008 | Krishnan et al. | |
| 2008/0201462 A1 | 8/2008 | Liss et al. | |
| 2008/0240156 A1* | 10/2008 | Elliot et al. | 370/468 |
| 2008/0263218 A1* | 10/2008 | Beerends et al. | 709/230 |
| 2009/0019525 A1 | 1/2009 | Yu et al. | |
| 2009/0147737 A1* | 6/2009 | Tacconi et al. | 370/329 |
| 2009/0147806 A1* | 6/2009 | Brueckheimer | 370/503 |
| 2009/0222555 A1* | 9/2009 | Qian et al. | 709/224 |
| 2009/0232017 A1* | 9/2009 | Carlisle | 370/252 |
| 2009/0232159 A1* | 9/2009 | Haran et al. | 370/468 |
| 2009/0276771 A1 | 11/2009 | Nickolov et al. | |
| 2010/0017494 A1 | 1/2010 | Hindawi et al. | |
| 2010/0088411 A1* | 4/2010 | Litofsky et al. | 709/224 |
| 2010/0150009 A1* | 6/2010 | Mangs et al. | 370/252 |
| 2010/0228947 A1 | 9/2010 | Sasao | |
| 2010/0250682 A1* | 9/2010 | Goldberg et al. | 709/206 |
| 2010/0250769 A1* | 9/2010 | Barreto et al. | 709/231 |
| 2010/0332640 A1 | 12/2010 | Goodrow et al. | |
| 2011/0029626 A1 | 2/2011 | Goodrow et al. | |
| 2011/0066841 A1 | 3/2011 | Goodrow et al. | |
| 2011/0066951 A1 | 3/2011 | Ward-Karet et al. | |
| 2011/0116390 A1* | 5/2011 | Ramachandran et al. | 370/252 |
| 2011/0222691 A1 | 9/2011 | Yamaguchi et al. | |
| 2011/0276688 A1* | 11/2011 | Qian et al. | 709/224 |
| 2012/0203818 A1 | 8/2012 | Lippincott et al. | |
| 2012/0226805 A1* | 9/2012 | Rojahn | 709/224 |
| 2012/0310890 A1* | 12/2012 | Dodd et al. | 707/646 |
| 2012/0324519 A1* | 12/2012 | Laughlin | 725/95 |

FOREIGN PATENT DOCUMENTS

| | | |
|---|---|---|
| JP | 2002247033 A | 8/2002 |
| JP | 2003-076434 | 3/2003 |
| WO | WO03/040944 A1 | 5/2003 |

OTHER PUBLICATIONS

"Configuring the Cisco IOS DHCP Relay Agent", Cisco Systems, Inc., first published May 2, 2005, last updated Nov. 17, 2006, 26 page.

"Entity Authentication Using Public Key Cryptography", U.S. Department of Commerce/National Institute of Standards and Technology, FIPS Pub 196, Feb. 18, 1997, 52 pages.

"Last Man Standing", IBM Corporation, http://www-01.ibm.com/support/docview,wss?uid=swg21506077, Oct. 27, 2011, 4 pages.

"Manpage of APT-GET", APT Team, http://web.archive.org/web/20041027155110/http://linuxreviews.org/man/apt-get/, retrieved Jul. 12, 2012, 12 pages.

"New Features in BES 4.0", http://web,archive.org/web/20061026095436/http://support.bigfix.com/bes/changes/changes_4_0.html, printed Jul. 9, 2012, 1 page.

"Positive security model", OWASP, http://web.archive.org/web/20060821235729/http://www.owasp.org/index.php/Positive_security_model, retrieved Jun. 18, 2012, 2 pages.

"Using a DOS variable in action script", BigFix, Inc., http://forum.bigfix.com/viewtopic,php?id=1867, retrieved Jul. 12, 2012, 1 page.

"Wake on LAN", BigFix, Inc., http://forum.bigfix.com/viewtopic.php?pid=12542, retrieved Aug. 1, 2012, 4 pages.

"Wake on LAN with a alteration", BigFix, Inc., http://forum.bigfix.com/viewtopic.php?id=3248, dated May 14-13, 2009, retrieved Jul. 11, 2012, 3 pages.

Arnaud, et al., "How to disable security warning popup about message containing script", BigFix, Inc., http://forum.bigfix.com/viewtopic.php?id=1519, retrieved Jul. 12, 2012, 2 pages.

Burrows, Daniel, "Modelling and Resolving Software Dependencies", http://people.debian.org/~dburrows/model.pdf, Jun. 15, 2005, 16 pages.

Firstbrook, Peter et al., "Magic Quadrant for Endpoint Protection Platforms, 2007", Gartnew, Inc., Dec. 21, 2007, 16 pages.

Goodnow, M., "Relay on the DMZ", BigFix, Inc., http://forum.bigfix.com/viewtopic.php?=428, retrieved Jul. 23, 2012, 6 pages.

Held, Gilbert, "The Internet Protocol and Related Protocols", The ABCs of TCP/IP, Chapter 4, Auerbach Publications 2002, 2003 CRC Press LLC, 56 pages.

"1E WakeUp", Published by 1E, Archived Jul. 24, 2008, Available online: http://web.archive.org/web/20080724185718/http://www.1e.com/SoftwareProducts/1EWakeUp/faq.aspx, 10 pages.

"BES Console Context Menu Wake-On LAN", Bigfix, Inc., http://web.archive.org/web/20061026092909/http://support.bigfix.com/bes/misc/bes-wol.html, available Oct. 26, 2006, 1 page.

"BigFix Action Language Reference", A Guide to the BigFix Action Shell Commands for the BigFix Enterprise Suite (BES), Dec. 6, 2006, 59 pages.

"BigFix Client ICMP Traffic Technical Details", BigFix Inc., http://support.bigfix.com/bes/misc/besclient_icmp.html, retrieved Jun. 16, 2012, 5 pages.

"BigFix Enterprise Suite (BES)", Console Operator's Guide, Version 7.1, last modified Jul. 26, 2008, 182 pages.

"BigFix Enterprise Suite (BES) Administrator's Guide", BigFix, Inc., Version 7.1, last modified Jul. 25, 2008, 108 pages.

"BigFix Remote Desktop for Windows", BigFix, Inc., http://support.bigfix.com/product/documents/BigFixRemoteDesktopGuide-v1.pdf, Version 1.0, Last Modified Sep. 13, 2007, retrieved Jul. 11, 2012, 13 pages.

Holmes, N., "BES Automatic Relay Settings", BigFix, Inc., http://forum.bigfix.com/viewtopic.php?id=182, last edited Sep. 18, 2006, retrieved Jul. 11, 2012, 4 pages.

Johnson, David B. et al., "DSR: The Dynamic Source Routing Protocol for Multi-Hop Wireless Ad Hoc Networks", Book: Ad hoc Networking, Chapter 5, 2001, 25 pages.

Kessler, Gary C., "An Overview of Cryptographic Methods", Network Design: Principles and Applications, Chapter 51, 2000 by CRC Press LLC, pp. 679-691.

Knuth, Donald E, "The Art of Computer Programming", Second Edition, Addison Wesley Longman Publishing Co., vol. 3/Sorting and Searching 1998, 39 pages.

Kus, Ben, "BigFix 7.1 Released", BigFix, Inc., http://forum.bigfix.com/viewtopic.pho?id=2258, retrieved Jul. 11, 2012, 2 pages.

Leach, Paul. J. et al,, "CIFS/E Browser Protocol", Internet Engineering Task Force, http://www.waterprings.org/pub/id/draft-leach-cifs-browser-spec-00.txt, Jan. 10, 1997, 24 pages.

Menezes, Alfred J. et al., "Public-Key Encryption", Handbook of Applied Cryptography, Chapter 8, Auerbach Publications 2000, CRC Press LLC 1997, Public-Key Encryption, 37 pages.

Sherif, Mostafah H., "Algorithms and Architectures for Security", Chapter 3, Published in "Protocols for Secure Electronic Commerce, Second Edition", CRC Press: Sep. 2004, 101 pages.

Tang, Hong et al., "Self-Organizing Networks of Communications and Computing", International Transactions on Systems Science and Applications, vol. 1, No. 4, 2006, pp. 421-431.

Tipton, Harold F. et al., "Information Security Management Handbook", 2006 Edition, 2006 by Taylor & Francis Group, LLC, 179 pages.

Todorov, Dobromir, "User Identification and Authentication Concepts", Mechanics of User Identification and Authentication: Fundamentals of Identity Management, Auerbach Publications, Chapter 1, 2007, 64 pages.

* cited by examiner

DYNAMIC BANDWIDTH THROTTLING

CROSS REFERENCE TO RELATED APPLICATIONS

This application claims priority to U.S. provisional application Ser. No. 61/242,278, filed 14 Sep. 2009, which application is incorporated herein in its entirety by this reference thereto.

BACKGROUND OF THE INVENTION

1. Technical Field

The invention relates to communications networks. More particularly, the invention relates to a technique for dynamic bandwidth throttling in communications networks.

2. Description of the Background Art

A basic problem in electronic networks is moving data from one point to another. There are typically two goals in this regard: one goal is to get the data across the network quickly; and the other goal is to let other people's data go across the network quickly, without one person's data getting in the way of another person's data. Often, one person's data (person A) is among the less urgent data in the network. In this case, it is desirable to have the other persons' data traverse the network quickly to free up bandwidth for person A's data.

One concern in this regard is moving data quickly when the network is not being used heavily, and slowing down and moving data very slowly when other data is more urgently needed in the network. Another concern is limiting data to a rate at which the network performs well, instead of moving data across the network because there is a supposed need to hurry.

Typically, the data is sent as fast as possible, it is received at the other end, and the transmission is then complete. This approach consumes a large portion of the bandwidth that is available in the network that other people might want to use. There are two concerns involved in this regard:

- Bandwidth, e.g. if somebody has a large file to move across the network, it is desirable to limit use of the available bandwidth because such use limits the rate at which the file can be transferred. It is also desirable to limit the effect of such use on latency in the network. While this large file is moving, if somebody has a small amount of data to move across the network, it is desirable for their data to go through quickly so that they do not notice a delay.
- Limiting the effect of one person's use of the network on other peoples' latency largely involves not having the one person's data stack up in buffers. Buffering devices on the network introduce latency because data fills the buffers if the data is sent too fast, and other persons' transmissions they have to wait their turn. Accordingly, it would be desirable not to send data so fast that it fills up all of the buffers, i.e. a user should not be able to send data faster than the bandwidth of the narrowest link between two endpoints.

It would therefore be desirable to provide a technique for dynamic bandwidth throttling in communications networks.

SUMMARY OF THE INVENTION

An embodiment of the invention provides a technique that keeps track of an approximation of the bandwidth of the narrowest link in a network by watching how fast data gets to the other end and then back again. The rate of data transmission is limited according to this approximation. The technique also keeps track of the dynamic capacity of the link, i.e. the amount of data that can be in-flight at the same time, neglecting any buffers. The technique looks at how much data is in-flight and, if there is more data in flight than the dynamic capacity of the network, the data transmission rate is slowed down.

DETAILED DESCRIPTION OF THE INVENTION

Effective Bandwidth

Figure 1:
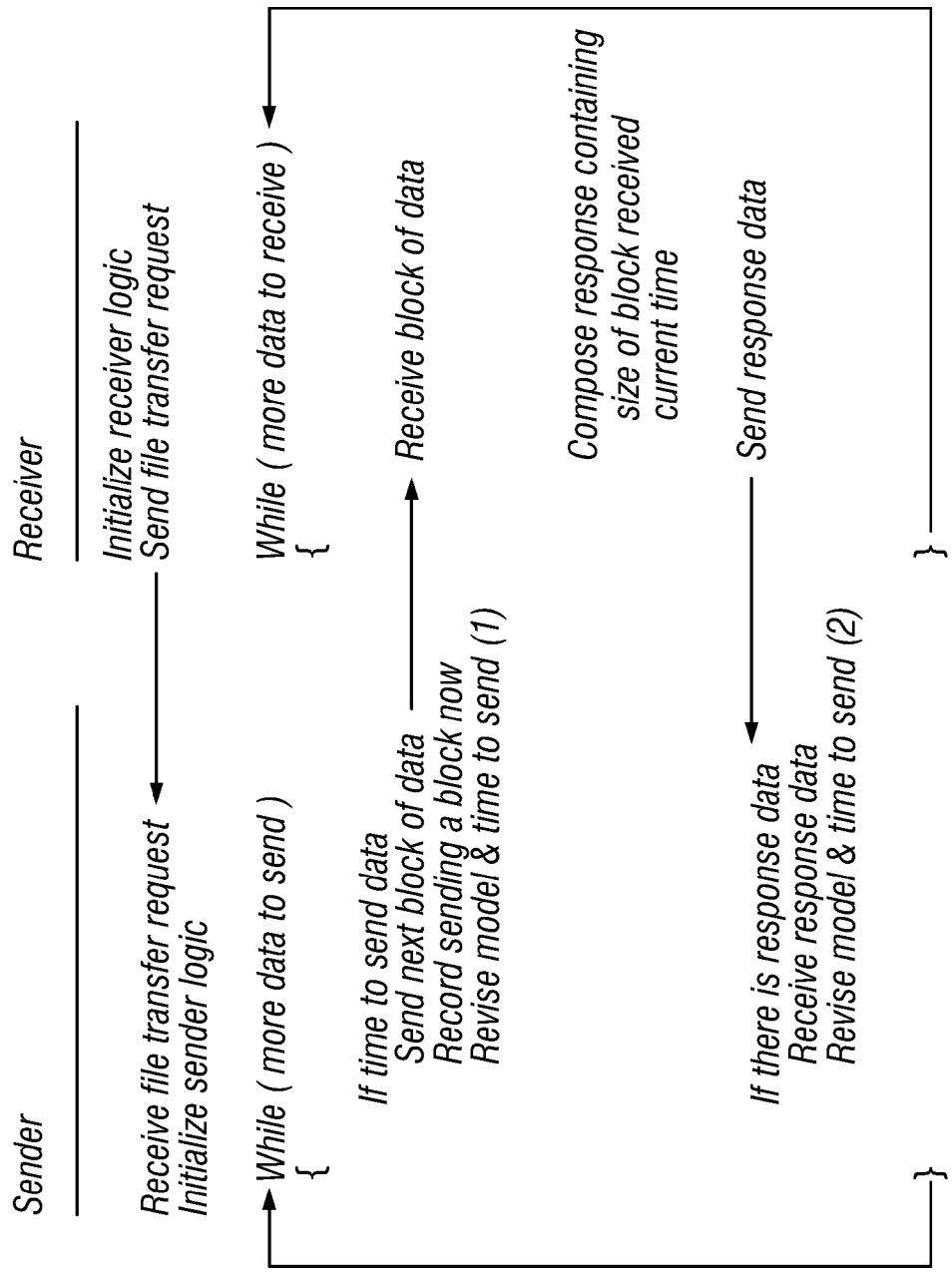
FIG. 1 is a flow diagram showing an implementation of a bandwidth throttling mechanism according to the invention.

An embodiment of the invention provides a technique that keeps track of an approximation of the bandwidth of the narrowest link in a network by watching how fast data gets to the other end and back again. The rate of data transmission is limited according to the approximation. FIG. 1 is a flow diagram showing an implementation of a bandwidth throttling mechanism according to the invention.

Dynamic Capacity

An embodiment also keeps track of the dynamic capacity of the link, i.e. the amount of data that can be in-flight at the same time, neglecting any buffers. The technique looks at how much data there is in-flight and, if there is more data in flight than the dynamic capacity of the network, the data transmission rate is slowed down to avoid having more data in flight than the dynamic capacity of the network. This approach limits the impact of data transmission on latency for other uses of the network because it only looks at the effect of a local load on the network, where almost no data is waiting in the buffers. Accordingly, other peoples' traffic gets through without waiting in the buffer as much either.

Block Size

An embodiment may also attempt to adjust the size of the blocks of data transferred to optimize the transfer rate. When blocks of data are received in their entirety, larger blocks can be attempted. When blocks of data are received in different sizes than they were sent, smaller blocks are used. This tends to find the 'just right' block size that minimizes the number of blocks that are fragmented by intermediaries.

Capacity and Lateness

An embodiment of the invention provides an approach that takes a fairly radical step down when there is a significant drain on the bandwidth of the network and pulls usage back considerably further to leave room for other traffic. To accomplish this, an embodiment looks at whether data is arriving later than it would on a clear network. The system looks at increments of the data that were sent out, makes an estimate of when the data is expected to arrive, and measures the difference between when the data is expected to arrive and when the data actually arrives. This phenomenon is referred to herein as the lateness of the data. If the lateness goes up significantly, this indicates that there is heavy traffic on the network, and the system responds to this by sending data more slowly.

While this aspect of the invention may be thought of as a form of load-balancing, there is something else needed to slow the transmission of data down. An embodiment of the invention looks at two factors:

1) Capacity of the network, which can be expressed as the time of data in-flight versus capacity; and
2) Lateness, which is the ideal arrival time of data versus the actual arrival time of the data.

Thus, while an embodiment provides a form of load-balancing, it is not a technique that is known because the approach taken in the invention does not have the global knowledge of the network that is required to perform actual load-balancing. Key to the invention is the fact that the system only looks at traffic from a single point in the network. For TCP traffic, there is not typically enough information about traffic at a single point in the network to measure capacity and lateness. A presently preferred embodiment of the invention operates at the TCP level. Thus, measurements are made directly from the TCP stack.

An embodiment of the invention provides a system that assembles several packets of data and tries to send the data across the network. This indicates how much of the data the system can buffer at this moment, which usually means that too much data was sent already. To address this, an embodiment of the invention adds a back channel in which the receiver tells the sender when it receives each unit of data and the size of the unit of data received. Thus, the receiver, every time it receives data, responds with a message to the sender containing the current time and the size of the unit of data received. The sender now has receiver's times for the various units of data. The sender keeps track of the time the data is sent and it also keeps track of when it receives the acknowledgement from the receiver.

There could be a problem because the sender's and receiver's clocks are not synchronized, but for computing a round-trip latency, this is not an issue. The system compares the sender's clock from the time the data is sent and the sender clock when the acknowledgement arrives back at the sender. This provides an upper bound on the round-trip latency of the data.

To determine lateness the system determines the outbound lateness and the inbound lateness. To do this, the system compares the transit times, i.e. the system looks at the time a particular unit of data was sent and the time that it was received. This is the transit time. The system then compares two or more different transit times to see how much later one was than the other. In this way, the system only subtracts the sender clocks and receiver clocks from each other, but it never cross-subtracts them. Thus, to arrive at a lateness value the system looks at transit time for units of data of a particular size, compares this to the transit time for units of data of the same size that were sent earlier, and determines much better or worse the current transmission rate is than the best ever measured so far, i.e. how late it is.

For purposes of implementing the invention, it does not matter if the sender's and receiver's clocks are synchronized or not because there is an actual real value in terms of transit time. The difference in transit times for each transmission, compared to a baseline, indicates that the network is slower or faster relative to the baseline, and thus provides a metric on network congestion. Adjustments can be made to the metric to address such factors as clock skew and the fact that the network path might change for each transmission.

An embodiment might compute a baseline to be the fastest ever transit observed during some interval of time, such as since when the transfer began, or, a preferred embodiment, might choose a newer transit as the baseline, instead of a slightly shorter, older transit. Thus, as time goes by the system uses more current transit information and does not compare a transmission to an old transit.

The invention thus considers local performance to develop, inter alia, a lateness metric. The system then uses use this metric to slow down, i.e. throttle, data transmission by assigning various penalties, preferably denominated in time, to local transmissions. The most basic penalty is determined by dividing an amount of data to be sent by the bandwidth and, as a result, calculate an amount of time that is designated as a sending penalty. The system assigns different penalties for various conditions and then adds the penalties together. The system uses a resulting total penalty value to decide when to send more data.

Penalties

In a presently preferred embodiment, five different criteria are used when assigning penalties. Those skilled in the art will appreciate that other criteria may be chosen within the scope of the invention and that these criteria are only exemplary.

Such criteria include, for example:

(1) Whether or not to send data, which is decided by the bandwidth;
(2) Trying to send data and failing because the buffers on the local system are full;
(3) Something else is sending data on the same system; the local system is unable to get data onto the network quickly enough;
(4) Stalling, where the receiver completely stops receiving data. In the latter case, i.e. if stalling occurs, the system assigns a penalty to provide a reasonable chance of starting up again when the transmission pipe is not completely, full. Thus, the system calculates a desired fullness for the pipe based on the dynamic capacity. The dynamic capacity is estimated, for example, by multiplying the observed best bandwidth by the round-trip latency. The system uses this value to calculate a desired amount of data that can be in-flight at a time. If it is determined that the amount of data sent goes over that amount, then the system assigns a penalty for being overfull to bring data transmission down to the fullness level.
(5) When data arrives late, the system assigns a penalty for late arrival. This brings local system use of bandwidth down when there is traffic because cross-traffic causes lateness, and the system uses the lateness to reduce local system use of bandwidth.

A key feature of the invention is to avoid interfering with other traffic on the network: it is not desirable to cause other sender's packets to get from end-to-end slowly; and if others are sending large amounts of data, it is desirable for them to be able to use a large amount of bandwidth. An embodiment of the invention, thus, is arranged to move large amounts of data around the network while limiting the interference with other traffic.

For example, Citrix (see citrix.com) provides a virtualization application. If more than a certain amount of latency is introduced in a Citrus connection, it hangs up, which shuts down, for example, a company help desk. This is an important concern. For example, consider the situation in which there is a large population of remote users in many different hotel rooms, and an application is updating software on their laptops while they are receiving email and web traffic and performing other tasks with their computers. These user's computers are located in remote segments, with the public Internet between their computers and the management infrastructure. The system must deliver updates to these users in a way that enables them to get their work done, based on what they are doing, yet when they walk away from their system, the system should then be able to optimize the use of bandwidth dynamically. That is, the system should take into account use of the network by the many users. The invention allows the management infrastructure and each user to manage outgoing network traffic on this basis. That is, a form of the invention may be installed on each user's computer to adjust the user's load on the network; and it may also be installed on the server that contains the software update application.

For purposes of the following discussion, each sender employs the herein disclosed bandwidth throttling mechanism. If any of the senders locally determine that a penalty is to be imposed, the local user's bandwidth consumption is throttled down, thus limiting the impact of the user (and thus that sender) on the overall network bandwidth. In this example, each of the clients acts as either a sender or receiver depending on which direction traffic is moving. Each sender, on performing a calculation and then receiving information back from a receiver for each packet that is sent to that receiver, applies the herein disclosed bandwidth throttling mechanism to make a determination on throttling. In this example, each sender most likely sends packets to multiple receivers; some senders transmit more data across the network to these multiple receivers and receive information back from these receivers. Any particular system might be acting as a sender in zero or more transactions at the same time it is acting as a receiver in zero or more transactions and these transactions may have the same or different partners. One example of this is an agent which can be sending a report to a relay at the same time it is receiving one or more downloads from the relay. Another example is a relay which can be receiving several downloads from its parent at the same time it is sending several downloads to children relays or child agents. Thus, each local user that accesses the network does so with a system might be acting as a receiver at the same time it is acting as a sender and, that thus has a local snapshot of these two measures: the capacity metric and the latency metric.

In the presently preferred embodiment, but not all embodiments, of the invention, the capacity and lateness metrics are determined on a per-connection basis. When one user computer is sending data to multiple systems it does not actually consider that, for some distance, the packets it transmits are traveling over the same network. For some purposes, there is an advantage to this approach because, for example, if there is a single bottleneck over which a user is sending two streams, it would be desirable to eliminate the total use of the streams and to limit the amount of data that is sent to a single stream, where the bottleneck is caused by combining the two streams on the single link. Thus, in this example, the bottleneck is caused by combining the two streams and can be eliminated by sending a single stream. Thus, the dynamic bandwidth throttling algorithm herein disclosed can be applied with or without consideration for other instances of dynamic bandwidth throttling occurring on the same system. With full knowledge of all dynamic bandwidth throttling transfers occurring from the same system, some consideration can be given to coordinating the transfers, such as detecting that multiple instances of the algorithm are interfering with each other, and allowing one to proceed at a faster pace than the other, or by balancing transmission such that many can occur simultaneously without impeding each other. In other equally preferred embodiments, systems might simply behave by sharing the available bandwidth without any direct knowledge of each other and would simply lower the rate at which they send as a result of using the same networking hardware on all or part of their journey.

Based on these two measures, a series of rules, or penalties (discussed above) are developed that are applied to the user's system locally. A user holds back on sending data if these measures in a predetermined combination produce a value that is beyond a predetermined threshold. The penalties are based upon certain observations, such as the fact that there is a problem with the ratio of data to bandwidth; or there are failures because the local buffers are full; or the system is stalling; or there is a dynamic capacity issue based on observed bandwidth times around latency; or there is late arrival of data. Any of these factors can impose a penalty, which then serves as a threshold for throttling.

Paying Back Penalties

A further aspect of the invention concerns techniques for paying back the penalties.

Immediate Penalties

In an embodiment of the invention, there are immediate penalties, which comprise an amount of time that a user must wait before their computer is allowed to send the next portion data. For example, the sending penalty is an immediate penalty.

Long Term Penalties

There are also long-term penalties, which are treated as having a half-life. For example, long-term penalties may comprise a debt that is paid off in an exponentially decaying way. For example, at the moment the system pays off half of the long term debt within the first 15 seconds, another quarter of it in the next 15 seconds, and so forth.

Compound Penalties

When the two penalties are present, a compound value is determined by combining the exponentially decaying long-term penalty, with the immediate penalty.

For purposes of the discussion herein, the penalty is designated L; there are also values for time, and for the overall penalty or debt. The system considers the total of the long-term debt that has been incurred and the immediate debt. The system then establishes a schedule for paying off the long-term debt. Because the long-term debt is denominated in time, the unit in which the system pays off the debt is already known. It takes five seconds to pay off five seconds of immediate debt. Accordingly, the actual decrease in debt over time is linear. This means that the time to delay before sending is equal to the immediate debt plus the difference between what the long-term debt was when the user started and what the long-term debt would be after the delay if it had decreased exponentially.

$$t = \text{Immediate} + \text{LongTerm} - \text{LongTerm}/2^{(t/h)}$$

where:
- t=the amount of time we need to wait before we can send again.
- Immediate=the time to wait due to immediate penalties
- LongTerm=the time to wait due to outstanding long term penalties
- h=half-life of long term penalties.

We can recast this equation into this form:

$$\text{Immediate} + \text{LongTerm} - t = \text{LongTerm}/2^{(t/h)}.$$

We can interpret the left-hand side of this equation as the current debt. It starts with a value of the sum of the immediate and long term debts and decreases linearly as time passes. The right-hand side of the equation is the exponentially decaying long term debt. It starts with a value of the long term debt and decreases exponentially over time. We can graph these two equations and when they two graphs intersect, we will have a value of t and a solution to the above equation.

A preferred embodiment of the invention calculates the point at which the current debt and the exponentially decaying long-term debt give the same answer. At this point, data is sent. Sending data always incurs an immediate debt because the bandwidth is not infinite. The system looks at how much long-term debt has been accumulated with this data, and then performs the whole calculation over again to determine when to send data again. The two curves, i.e. that of the current debt and the exponentially decaying long-term debt, always meet. When they meet, it is time to send more data and then recalculate the penalty. In fact, the curves always meet in the best time limit it takes to pay off the entire debt.

Distributed Enrollment

Another embodiment of the invention concerns distributed enrollment, where there are multiple receivers and transmitters. They all continue to function, even when performing the above calculation, but they all choose the same network. In one embodiment, there is not any priority among the users as to which one is allowed to send data next, i.e. they do not coordinate sending in any way and thus act autonomously. This feature, however, could be included in various embodiments of the invention. The users do see each other as traffic in the network. To the extent that they interfere with each other they see that their packets propagate through the network more slowly than necessary. This results in a lateness penalty and the user's computers back off because they see the other traffic. The user computers all use the same algorithm, and as they notice they are contributing to the network latency problem they all accumulate more penalties and, as a result, they throttle their transmission of traffic to a good average speed, e.g. where the long-term penalties are being incurred as they are being paid off.

Configurability

One aspect of the invention provides a degree of user configurability, for example the user may select a factor, for example that establishes: How much penalty the user wants to pay? How quickly the user wants to payoff the penalty? What is the user's fastest payoff rate? Did the user set a cap below the maximum bandwidth of the link?

For example, the user may set a parameter for the payoff, e.g. minus 10, which is the half-life of long-term debt. This value establishes how long ago in the past the system looks for information about what traffic to send, and at what rate, in the present.

In other embodiments, related to this is a maximum penalty that the user allows to be charged, which controls how responsive the system is. A value "alpha" is thus established that sets how responsive the system must be to user traffic; the slope is a value that establishes how slow the system can go. There is also a value for lateness. For example, the user can rate lateness on a scale from zero to one to establish how much penalty is charged for lateness. If there is a desired minimum usage of the network's capacity, e.g. $1/10^{th}$ of capacity, then when full lateness occurs and a packet was clearly interfered with by other heavy traffic while traversing the network, the system charges the square of this value, which in this example is 100 times the packet size, in long-term lateness penalty. This provides control over system equilibrium.

An embodiment of the invention provides a predetermined weighting to these various values. One factor that can set these weightings, for example, is time, e.g. on the first of the month the IT department performs virus updates, and it is critical that the IT department have better access to the network than other users at this time. In this example, the values for lateness and/or capacity are weighted in such a way that the system does not assess much of a penalty for lateness or for capacity against the IT department at this time. Rather, the system gives more capacity and less lateness to the IT department because this is a critical time of the month for this user.

Other Uses for the Metric

An embodiment of the invention uses the above discussed metrics to determine an average of the quality of service (QoS) provided by the network, for example to mobile device users. Accordingly, the information obtained through use of the inventive technique disclosed herein can be used for purposes other than bandwidth throttling. Such information can be used for such aspects of the network as the state of the network, network capacity, and latency, effective bandwidth.

Baseline

An important aspect of the invention involves a metric produced by combining use, the capacity measure, and the lateness measure. This metric is used to control the throttling of the system and assess a penalty based on the metric. The metric is not just a time-of-flight metric. Rather than simply looking at the round-trip for a particular piece of data, the invention provides an approach that looks at the lateness for the two trips taken by the data cross the network, i.e. for the outbound and inbound trip, independently. Combining these values and comparing the paths, e.g. by subtracting the lateness, and by entering the round-trip latency by adding the fastest outgoing trip to the fastest incoming trip the system determines a round-trip latency value that is less than any particular trip. This metric establishes the best possible performance in each direction and forms a baseline.

The baseline values are recalculated periodically to avoid the potential for drift one way or the other if network conditions actually change. The criteria for selecting the time at which to determine the metric based upon more recent network conditions is primarily a matter of choice. The main constraining factors concern how much clock skew the system can tolerate and how quickly the user wants to respond to changes of a certain magnitude in the network.

The actual mechanisms implemented in hardware and/or software for generating the time-stamped messages, sending the messages over the network, time stamping the messages at the other end, and sending the messages back may be practiced using only the skills available to a person skilled in the art of writing code and working with networks. The resulting curve is key to the invention. Thus, the two metrics discussed above are used to assess the penalty and determine the manner in which the system pays off delaying penalties versus the immediate penalty and the manner in which the penalty is decayed. This provides a key aspect of the invention.

One embodiment improves system response and accuracy by providing a return channel for the time stamp information from the receiving end of the message. As discussed above, it is not important that the clocks at the sending and receiving end be synchronized with each other, i.e. the invention can accommodate the sender and receivers clock being unsynchronized. The preferred embodiment builds a baseline relative to the clock from one end to the other.

Management Functions

The system provides feedback that is accessible via a console or a server. In an embodiment, a client downloads packets from a server and, in the process, sends time stamps to the server via a back channel that indicate when each packet arrives and the size of packet. As a result of this, the server can calculate the time of flight of the entire packet and get an effective bandwidth, e.g. an effective rate of transmission. The system measures this rate and can expose it to various system inspectors to make it inspectable through a system management platform. In such platform, various system agents may be configured to report the rate at which they receive downloads. This information can then be used, for example, to tune the system, to identify hot spots or places where throttling forces a computer to send traffic slowly, and/or to identify computers for which throttling is not necessary because there is sufficient effective bandwidth available.

This information is captured at the sender, for example, in a predetermined format and at desired intervals such as, for example, monthly, weekly, daily, hourly, minute-by-minute, in a register somewhere within, or associated with, the sender. In an embodiment, the register is interrogated by an inspector and the information thus obtained is reported to an operator. Based upon the reporting purposes and the information itself, the operator may then decide to change some of the parameters in the system. For example, the operator could adjust the minimum rate at which the sender was allowed to send traffic. An embodiment of the invention maintains statistics not just over a day or a week but could also do so over a last download. For example, the system could keep track of the last five things that have been downloaded to a particular computer with regard to an effective bandwidth to/from the computer.

Another embodiment of the invention adds a scheduling mechanism, where the bandwidth throttle parameter, e.g. the parameters that are used to tune the throttling mechanism, has a time-of-day input in which the function itself decides on what is the effective bandwidth should be. For example, minimum/maximum rates can be established for use in adjusting the thresholds at certain times of day. The scheduling mechanism then controls the parameterization of the rate. For example, at nighttime the system could increase the rate at which traffic is allowed to flow, and yet it would still adjust to other traffic in the network at night.

In another embodiment, the sender maintains a table of addresses for every receiver identifying at what point in time it sent a packet that started at a particular seek address within a file. The table maintains the time the information left. When the recipient receives a packet, it sends back a time stamp and size of the packet. The sender then adjusts the table to indicate the roundtrip transit time of the packet. From that value the sender calculates an effective bandwidth. Then, based on the history of the effective bandwidth, the system adjusts the rate at which the sender sends more data across the network, i.e. the rate at which newer parts of the download are sent. Effective bandwidth throttling is performed during the download. If the transit time for a packet is seen to increase, then the system slows down the rate at which it is adding network traffic into that network segment. By maintaining the table, the system provides information about the rate at which a particular sender can send traffic to its receivers. An embodiment of the invention performs various calculations to generate statistics on the rate at which the overall sender is capable of sending to all of its receivers. The information in the table and the statistics are useful for anyone who is trying to tune the system.

In the case of identifying network segments that are heavily trafficked it is possible to use the information in the table to have certain receivers start receiving from a different server. The instrumentation of that information can flow back to a management framework that allows an operator to adjust the system. Thus, the rate at which the packets leave can be lowered, i.e. the operator can tune the system. The system provides a mechanism that includes various constants that adjust the rate at which the mechanism adapts to increases and/or decreases in traffic. Thus, the system can adjust how sensitive it is to traffic in a particular vicinity and how quickly it reacts and comes back up to using the bandwidth again. In one embodiment, the mechanism typically steps off and then gradually comes back up. Hysteresis may be incorporated into the rate of throttling and/or increase in bandwidth usage to set a control curve.

Another embodiment adjusts the constants for use in reporting the effective bandwidth and how much traffic is handled at different network segments. An embodiment builds a network map, and then an operator sets parameters that tune the mechanism and adjust the traffic flow. For example, it might be desirable to have the parameters that drive the effective rate change based on the time of day or other characteristics of the environment.

Parameters that can be Used to Control the Algorithm

Maximum control—An embodiment allows a user to set a maximum bandwidth to consume. The algorithm ensures that it never exceeds this limit by delaying sending.

Minimum control—An embodiment allows a user to set a minimum bandwidth to consume. The algorithm attempts to not go below this rate even if there is competing traffic.

Percentage control—An embodiment allows a user to set a percentage of the bandwidth to consume. This control acts to delay sending. If the maximum observed bandwidth is 100 mbits, and the user configures the percentage control to 10%, the algorithm delays sending data to stay below 10 mbits. If traffic starts to interfere, it slows down further. Once the competing traffic subsides, the algorithm increases usage back up to 10 mbits.

System Implementation

Figure 2:
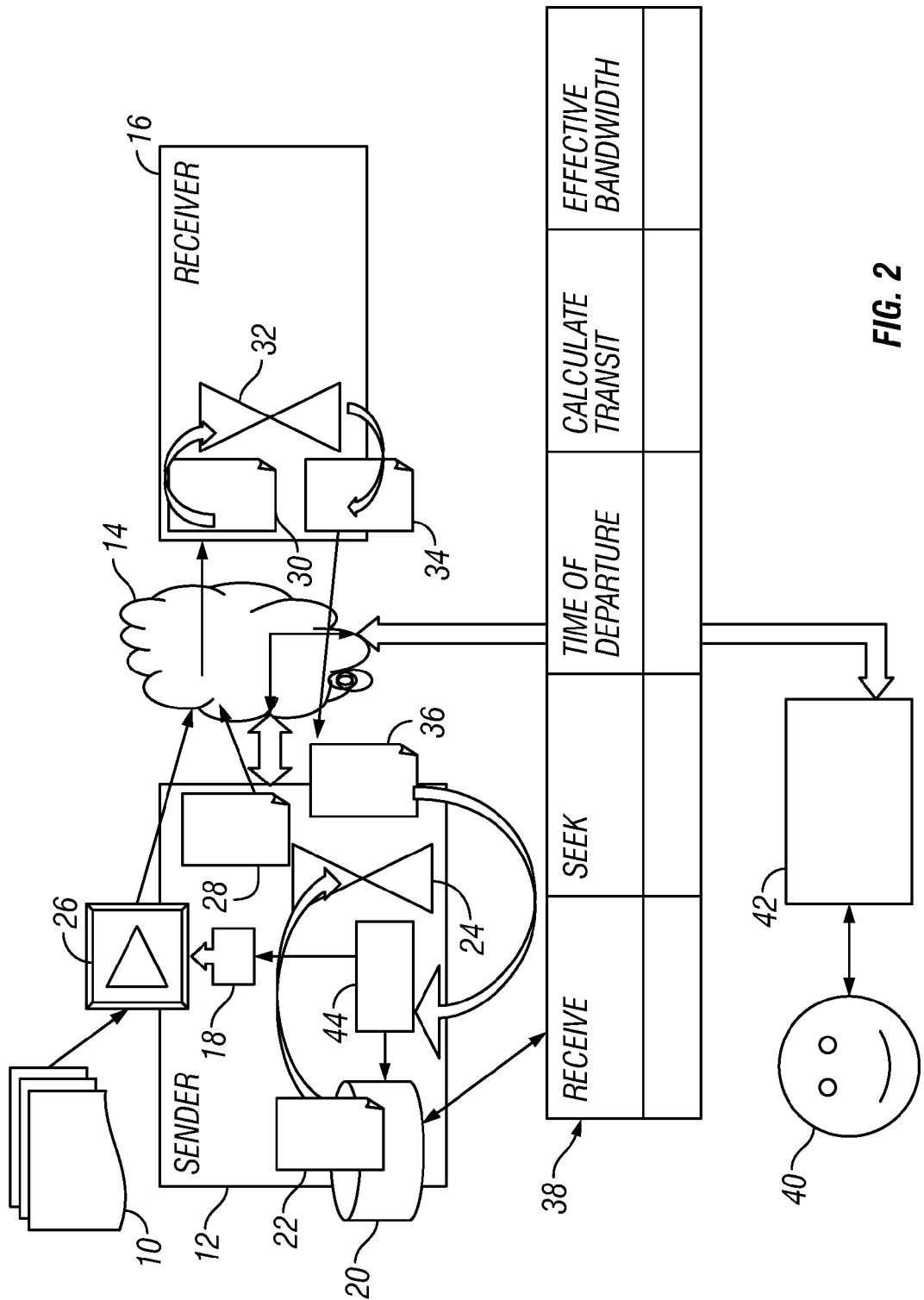
FIG. 2 is a block schematic diagram showing a network including an sender and a receiver that implement a bandwidth throttling mechanism according to the invention.

FIG. 2 is a block schematic diagram showing an implementation of a bandwidth throttling mechanism according to the invention. A presently preferred embodiment of the invention is implemented in a system that comprises a sender 12 and a receiver 16 which are configured to communicate with each other over a network 14, such as the Internet or an enterprise network. As discussed above, each sender can also be a receiver and vice versa. This is because each local system makes an autonomous, local determination of the above-mentioned metric. In one embodiment, the sender transmits a series of packets that form part of a file 22, which may be stored locally in a storage medium 20. The seek address of the packets, their sizes, and the time of departure are stored in the senders state table 38 as each packet 28 is sent to the receiver. At the receiver, packets 30 are received and routed to a time stamp mechanism 32, where time-stamp packets 34, containing the number of bytes received and the receiver's current time are then returned to the sender. Upon receipt the sender receives the number of bytes received/receiver's time-stamp packets 36 from the receiver and updates the state table 38 with the these data, as well as the sender's time of receipt, where upon calculations of roundtrip duration, lateness, capacity, and other metrics, as well as various penalties are performed with a processor 44. This information may be stored on a storage medium 20, for example for future use in reporting and/or in determining a payoff schedule for a penalty. The processor determines the time and size of the next transmission packet. The processor operates a throttle mechanism 18 that controls the transmission mechanism 26, and thus controls the rate at which traffic 10 is sent over the network by the sender.

While some embodiments of the invention contemplate the use of a header, the invention does not require the adding of a header to the data that is sent. In the presently preferred embodiment of the invention, block sizes and departure times are written to a state table on the sender when each packet departs. The following describes the presently preferred embodiment:

When the sender begins transmission of a file, it initializes a state table, sets the confirmed position to 0, and starts a stop watch which computes elapsed time as the transfer occurs.

Whenever the sender decides to send a block of data of a particular size, it reads that block of data from the file. It then adds an entry to its sending state table filling in the seek address, block size, and the time of departure, fields:

| Seek address | Size of block being sent | Senders stopwatch value |
| --- | --- | --- |
| 0 | 1000 | 0 |
| 1000 | 1000 | 25 |
| 2000 | 1000 | 55 |

Meanwhile, the receiver is waiting for data to arrive. When data begins to arrive, it initializes its own stop watch. As each block arrives, it composes a response containing the current value of its stop watch and the size of the block of data it just received, which it immediately sends back to the sender. The receiver typically then writes the received data to a file and goes back to read another block of data. Besides handling error and exit conditions, the only other thing the receiver does is close the file when the transfer is completed.

As the sender continues to write blocks of data to the network under the control of the throttling algorithm, it also watches for responses from the receiver. When the sender receives a timestamp packet, the sender processes it by consulting an incrementing 'receiver total bytes' counter that is tracking the total of all the confirmed received packet sizes. It then searches through the sent data table, to locate a record containing the received total bytes counter between the seek address value and the seek address plus block size values of the record. Once found, it can use the 'time of departure' value and the sender's current time to compute the round trip transit time.

When a response arrives, the sender:
1) Advances the receiver's confirmed position by the size of the block just confirmed in the response;
2) Purges records from the sending state table that correspond to positions earlier in the file than the just confirmed position;
3) Computes the round trip time:

RoundTripTime=TimeResponseReceived−TimeDataSent

4) Computes outbound and inbound transits for bookkeeping purposes. A transit is composed of departure and arrival times, each based on different clocks:
   OutboundTransit=

Departure=TimeDataSent,

Arrival=TimeDataReceived'

InboundTransit=

Departure=TimeDataReceived'

Arrival=TimeResponseReceived

TimeDataSent and TimeResponseReceived are based on the senders' clock. TimeDataReceived' is based on the receivers' clock. Although transits contain time stamps that are based on different clocks, the embodiment compares the latest transits with previous transits to keep track of the fastest observed inbound and outbound transits.

TransitA is deemed faster than TransitB when:

Arrival(TransitA)−Arrival(TransitB) is less than Departure(TransitA)−Departure(TransitB)

One can also define a subtraction operation on transits and this can be used to compute a time interval that represents the delay observed by one transit relative to another:
TransitA−TransitB is defined to be:

Arrival(TransitA)−Arrival(TransitB)−(Departure(TransitA)−Departure(TransitB))

The difference in the basis of the sender and receivers clocks cancels out of comparison and subtraction operations. This is important to the algorithm.

The algorithm uses the subtraction operation to compute the excessOutboundTimeDelay which is defined to be how much longer the latest observed outbound transit is than the fastest observed outbound transit:
excessOutboundTimeDelay= latestOutboundTransit−fastestOutboundTransit=Arrival(latestOutboundTransit)−Arrival(fastestOutboundTransit)−(Departure(latestOutboundTransit)−Departure(fastestOutboundTransit))

The above reduces to a time interval that represents the delay of the latest transit relative to the fastest transit.

Similarly, an excessInboundTimeDelay is computed by the algorithm:
excessInboundTime= latestInboundTransit−fastestInboundTransit=Arrival(latestInboundTransit)−Arrival(fastestOutboundTransit)−(Departure(latestInboundTransit)−Departure(fastestOutboundTransit))

The algorithm adds these together to produce the idealized duration:
idealizedDuration=

RoundTripTime−excessOutboundTime−excessInboundTime

The idealized duration is how long the round trip would take if the outbound and inbound transits had the same performance characteristics as the fastest observed outbound and inbound transits. The amount of data that is acknowledged to have traversed the line during this time interval is computed by subtracting the seek address of the sending table from the sum of the response sizes received to this point which is the position acknowledged to have been received). The idealized effective bandwidth of those bytes is computed:

Bandwidth=bytesAcknowledged/idealizedDuration

The maximum observed effective bandwidth is then computed by taking the maximum of itself and this latest measured bandwidth.

maxBandwidth=max(maxBandwidth,Bandwidth)

In addition to the above, the algorithm computes fastest round trip time:

fastestRoundTripTime=fastestInboundTransit−fastestOutboundTransit

=Arrival(fastestInboundTransit)−Arrival(fastestOutboundTransit)−(Departure(fastestInboundTransit)−Departure(fastestOutboundTransit))

And from this, the capacity is computed:

capacity=maxBandwidth*fastestRoundTripTime

Thus, the series of packets are used to determine capacity and lateness (and bandwidth as well) and may use a state table, as described above, or may include a header or tag. In all embodiments of the invention, such data structure provides fields in which a time of departure, receive timestamp, seek time, calculated transit time, and effective bandwidth metric can be recorded.

In an enterprise, a management function 40, as discussed above, may use an inspection mechanism 42 to collect information regarding bandwidth on a location by location basis, and may also be used to set various parameters for throttling, all as discussed above. An example of an inspection system of the type that may be used in connection with the invention is discussed in U.S. Pat. No. 6,931,434, Method and apparatus for remotely inspecting properties of communicating devices, which application is incorporated herein in its entirety by this reference thereto.

Figure 3:
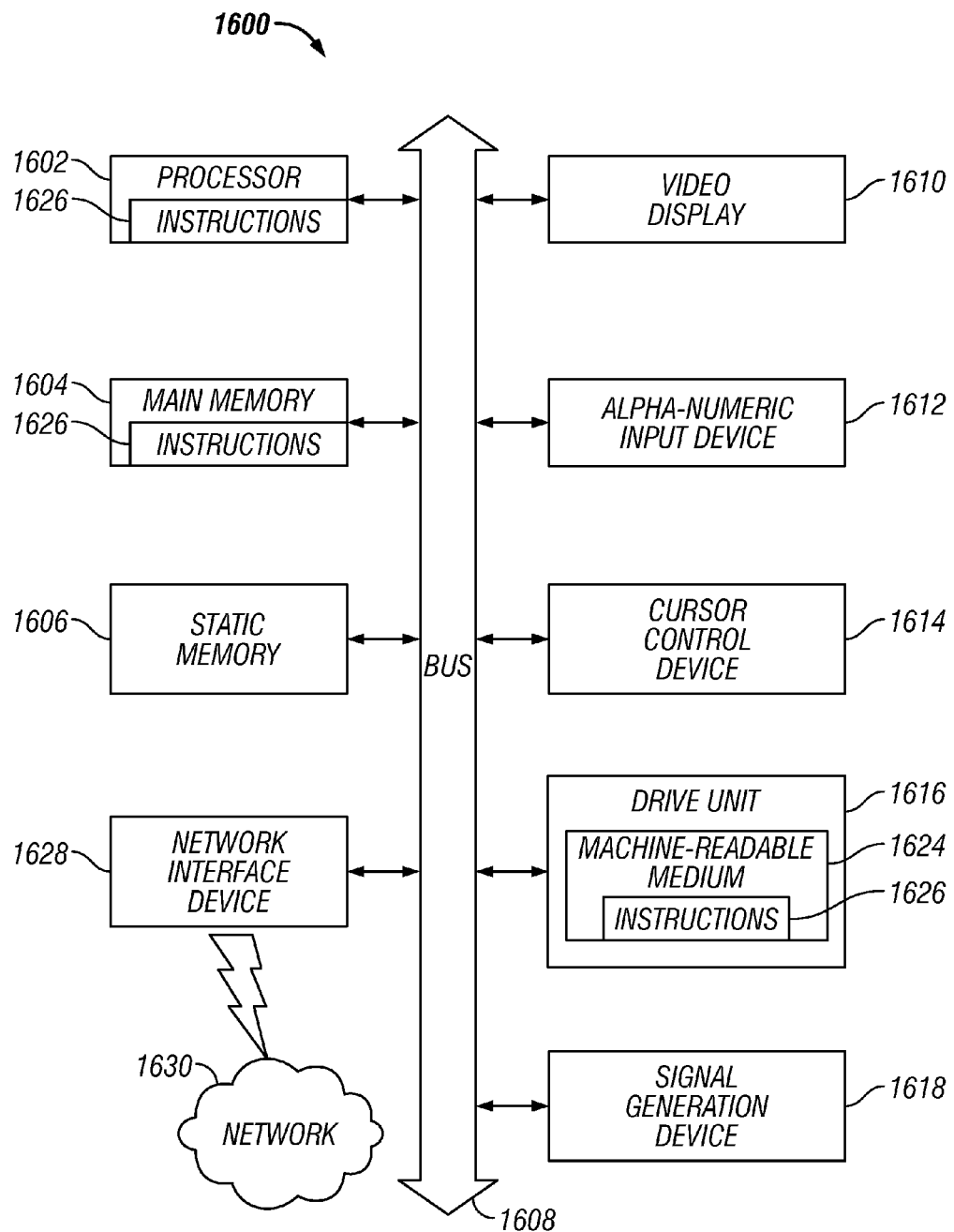
FIG. 3 is a block schematic diagram of a system in the exemplary form of a processor implemented computer system within which there is a set of instructions for causing the system to execute any one or more of the functions and/or steps of the embodiments of the invention disclosed herein.

FIG. 3 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for dynamic bandwidth throttling, comprising:
   recording, by a sender computer, transit times for packets in a network connection between the sender computer and a receiver computer over a predetermined period of time;
   determining, by the sender computer, a baseline transit time value based on the recorded transit times;
   recording, by the sender computer, a latest transit time for a packet sent to the receiver computer using the network connection;
   determining, by the sender computer, a capacity metric and a lateness metric based on the latest transit time and the baseline transit time value;
   determining, by the sender computer, a penalty based on the capacity metric and the lateness metric;
   determining, by the sender computer, a delay time for a subsequent packet to be transmitted from the sender computer to the receiver computer using the network connection based on the penalty; and
   delaying, by the sender computer, the subsequent packet according to the delay time to limit a rate of data transmission by the sender computer on the network connection.

2. The method of claim 1, further comprising:
   adjusting the size of blocks of data transferred to optimize a transfer rate, wherein when blocks of data are received in their entirety, transmission of larger blocks is attempted; and when blocks of data are received in different sizes than they were sent, smaller blocks are sent.

3. The method of claim 1, wherein the penalty comprises a compound penalty that combines an immediate penalty and the long-term penalty, wherein the immediate penalty represents an immediate debt the sender computer must pay before sending a next portion of data, wherein the immediate debt is paid in linear manner over time, wherein the long-term penalty comprises a long-term debt that is paid off in an exponentially decaying manner over time, and wherein determining the delay time comprises determining a time at which the immediate penalty and the long-term penalty are paid off.

4. The method of claim 1, further comprising:
   determining said penalty based upon the following:
      whether or not to send data based upon bandwidth;
      trying to send data and failing because buffers on a local system are full;
      another sender is sending data on a same system and a local system is unable to get data onto the network quickly enough;
      stalling, where a receiver completely stops receiving data; and
      when data arrives late, assigning a penalty for late arrival.

5. The method of claim 1, wherein recording transit times for packets in the network connection comprises:

sending a given packet having a sender timestamp to the receiver computer;

receiving, at a return time, a response packet having a receiver timestamp, wherein the receiver computer sends the response packet in response to receiving the given packet;

determining an outbound transit time based on the sender timestamp and the receiver timestamp; and determining an inbound transit time based on the receiver timestamp and the return time.

6. The method of claim 1, comprising:

record transit times for packets in network connection between a sender computer and a receiver computer over a second period of time; and updating the baseline transit time value based on the transit times recorded over and period of time.

7. The method of claim 3, wherein determining the immediate penalty comprises dividing an amount of data to be sent in the subsequent packet by bandwidth to form an amount of time that is designated as a sending penalty.

8. The method of claim 7, wherein determine the delay time comprises:

determining the delay time, t, to wait before sending a next portion of data by solving the following equation:

$$t = \text{immediate} + \text{long\_term} - \frac{\text{long\_term}}{2^{t/h}},$$

where is the delay time, immediate is a time to wait due to immediate penalties, long\_term is a time to wait due to outstanding long-term penalties, and h is a half-life for decay of long-term penalties.

9. The method of claim 8, wherein solving the equation comprises:

finding a value for t at which a first equation:

current\_debt=immediate+long\_term−t intersect with a second function:

$$\text{decaying\_long\_term\_debt} = \frac{\text{long\_term}}{2^{t/h}};$$

and setting the delay time equal to t.

10. The method of claim 1, further comprising providing parameters that can be used to control bandwidth, said parameters comprising any of:

a maximum control parameter that allows a user to set a maximum bandwidth to consume, wherein said parameter delays sending so that bandwidth use never exceeds said maximum;

a minimum control parameter that allows a user to set a minimum bandwidth to consume, wherein said attempts to not go below said minimum bandwidth, even if there is competing traffic; or a percentage control parameter that allows a user to set a percentage of bandwidth to consume, wherein said parameter delays sending to stay below a maximum percentage of available bandwidth, wherein if sending starts to interfere with said available bandwidth, sending is slowed down further, and wherein once competing traffic subsides, the sending is increased back up to said percentage.

11. A dynamic bandwidth throttling apparatus, comprising:

a processor; and a memory coupled to the processor, wherein the memory comprises instructions which, when executed by the processor, cause the processor to:

record transit times for packets in a network connection between a sender computer and a receiver computer over a predetermined period of time;

determine a baseline transit time value based on the recorded transit times;

record a latest transit time for a packet sent to the receiver computer using the network connection;

determine a capacity metric and a lateness metric based on the latest transit time and the baseline transit time value;

determine a penalty based on the capacity metric and the lateness metric;

determine a delay time for a subsequent packet to be transmitted from the sender computer to the receiver computer using the network connection based on the penalty; and delay the subsequent packet according to the delay time to limit a rate of data transmission by the sender computer on the network connection.

12. The apparatus of claim 11, said processor configured to provide parameters that can be used to control bandwidth, said parameters comprising any of:

a maximum control parameter that allows a user to set a maximum bandwidth to consume, wherein said parameter delays sending so that bandwidth use never exceeds said maximum;

a minimum control parameter that allows a user to set a minimum bandwidth to consume, wherein said attempts to not go below said minimum bandwidth, even if there is competing traffic; or a percentage control parameter that allows a user to set a percentage of bandwidth to consume, wherein said parameter delays sending to stay below a maximum percentage of available bandwidth, wherein if sending starts to interfere with said available bandwidth, sending is slowed down further, and wherein one competing traffic subsides, the sending is increased back up to said percentage.

13. The apparatus of claim 11, wherein the penalty comprises a compound penalty that combines an immediate penalty and the long-term penalty, wherein the immediate penalty represent an immediate debt the sender computer must pay before sending a next portion of data, wherein immediate debt is paid in a linear manner over time, wherein the long-term comprises a long-term debt that is paid off in an exponentially decaying manner over time, and wherein determining the delay time comprises determining a time at which the immediate penalty and the lone-term penalty are paid off.

14. The apparatus of claim 13, wherein determine the delay time comprises:

determining the delay time, t, to wait before sending a next portion of data by solving the following equation:

$$t = \text{immediate} + \text{long\_term} - \frac{\text{long\_term}}{2^{t/h}},$$

where t is the delay time, immediate is a time to wait due to immediate penalties, long\_term is a time to wait due to outstanding long-term penalties, and h is a half-life for decay of long-term penalties.

15. The apparatus claim 14, wherein solving the equation comprises:

finding a value for t at which a first equation:

current_debt=immediate+long_term−t intersects with a second function:

$$decaying\_long\_term\_debt = \frac{long\_term}{2^{t/h}};$$

setting the delay time equal to t.

16. A computer program product comprising a non-transitory computer readable storage medium having a computer readable program stored therein, wherein the computer readable program, when executed on a computing device, causes the computing device to record transit times for packets in a network connection between a sender computer and a receiver computer over a predetermined period of time;

determine a baseline transit time value based on the recorded transit times;

record a latest transit time for a packet sent to the receiver computer using the network connection;

determine a capacity metric and a lateness metric based on the latest transit time and the baseline transit time value;

determine a penalty based on the capacity metric and the lateness metric;

determine a delay time for a subsequent packet to be transmitted from the sender computer to the receiver computer using the network connection based on the penalty; and delay the subsequent packet according to the delay time to limit a rate of data transmission by the sender computer on the network connection.

17. The computer program product of claim 16, wherein the computer readable program further causes the computing device to provide parameters that can be used to control bandwidth, said parameters comprising any of:

a maximum control parameter that allows a user to set a maximum bandwidth to consume, wherein said parameter delays sending so that bandwidth use never exceeds said maximum;

a minimum control parameter that allows a user to set a minimum bandwidth to consume, wherein said attempts to not go below said minimum bandwidth, even if there is competing traffic; or a percentage control parameter that allows a user to set a percentage of bandwidth to consume, wherein said parameter delays sending to stay below a maximum percentage of available bandwidth, wherein if sending starts to interfere with said available bandwidth, sending is slowed down further, and wherein once competing traffic subsides, the sending is increased back up to said percentage.

18. The computer program product of claim 16, wherein the penalty comprises a compound penalty that combines an immediate penalty and the long-term penalty, wherein the immediate penalty represents an immediate debt the sender computer must pay before sending a next portion of data, wherein the immediate debt is paid in a linear manner over time, wherein the long-term penalty comprises a long-term debt that is paid off in an exponentially decaying manner over time, and wherein determining the delay time comprises determining a time at which the immediate penalty and the long-term penalty are paid off.

19. The computer program product of claim 18, wherein determine the delay time comprises:

determining the delay time, t, to wait before sending a next portion of data by solving the following equation:

$$t = immediate + long\_term - \frac{long\_term}{2^{t/h}},$$

where t is the delay time, immediate is a time to wait due to immediate penalties, long_term is a time to wait due to outstanding long-term penalties, and h is a half-life for decay of long-term penalties.

20. The computer program product of claim 19, wherein solving the equation comprises:

finding a value for t at which a first equation:

current_debt=immediate+long_term−t intersects with a second function:

$$decaying\_long\_term\_debt = \frac{long\_term}{2^{t/h}};$$

and setting the delay time equal t.

* * * * *